United States Patent
Itsumi et al.

(10) Patent No.: US 12,283,110 B2
(45) Date of Patent: Apr. 22, 2025

(54) INFORMATION PROCESSING DEVICE, INFORMATION PROCESSING SYSTEM, AND INFORMATION PROCESSING METHOD

(71) Applicant: NEC Corporation, Tokyo (JP)

(72) Inventors: Hayato Itsumi, Tokyo (JP); Yusuke Shinohara, Tokyo (JP); Koichi Nihei, Tokyo (JP); Takanori Iwai, Tokyo (JP); Florian Beye, Tokyo (JP); Charvi Vitthal, Tokyo (JP)

(73) Assignee: NEC CORPORATION, Tokyo (JP)

( * ) Notice: Subject to any disclaimer, the term of this patent is extended or adjusted under 35 U.S.C. 154(b) by 27 days.

(21) Appl. No.: 18/028,486

(22) PCT Filed: Oct. 5, 2020

(86) PCT No.: PCT/JP2020/037672
§ 371 (c)(1),
(2) Date: Mar. 24, 2023

(87) PCT Pub. No.: WO2022/074700
PCT Pub. Date: Apr. 14, 2022

(65) Prior Publication Data
US 2023/0360405 A1    Nov. 9, 2023

(51) Int. Cl.
*G06V 20/56*      (2022.01)
*G06T 7/00*       (2017.01)
(Continued)

(52) U.S. Cl.
CPC ............ *G06V 20/56* (2022.01); *G06T 7/0002* (2013.01); *G06T 7/62* (2017.01); *G06V 10/25* (2022.01);
(Continued)

(58) Field of Classification Search
CPC .................................. G06V 20/56; G06T 7/62
(Continued)

(56) References Cited

U.S. PATENT DOCUMENTS

2019/0362185 A1* 11/2019 Irshad .................... G06V 10/82
2020/0151487 A1*  5/2020 Yonezawa ............ H04N 19/167
2021/0012126 A1*  1/2021 Porta .................. B60H 1/00742

FOREIGN PATENT DOCUMENTS

JP    2016-181072 A    10/2016
JP    2017-062638 A     3/2017
(Continued)

OTHER PUBLICATIONS

International Search Report for PCT Application No. PCT/JP2020/037672, mailed on Dec. 1, 2020.

*Primary Examiner* — Amir Shahnami
(74) *Attorney, Agent, or Firm* — Sughrue Mion, PLLC

(57) ABSTRACT

An information processing device includes: an image acquisition unit configured to acquire an image captured by an imaging unit mounted on a vehicle; a target detection unit configured to detect a target region including a target in the acquired image; a classification identification unit configured to identify classification including a type of the detected target and a size of the detected target region; and a region determination unit configured to determine a region obtained by adding a margin corresponding to the identified classification to the target region as an image processing region.

17 Claims, 12 Drawing Sheets

(51) Int. Cl.
  *G06T 7/62* (2017.01)
  *G06V 10/25* (2022.01)
  *G06V 10/764* (2022.01)
  *G06V 20/52* (2022.01)
(52) U.S. Cl.
  CPC ............ *G06V 10/764* (2022.01); *G06V 20/52* (2022.01); *G06T 2207/30168* (2013.01); *G06T 2207/30252* (2013.01); *G06V 2201/07* (2022.01)
(58) Field of Classification Search
  USPC ......................................................... 348/148
  See application file for complete search history.

(56) References Cited

FOREIGN PATENT DOCUMENTS

| | | |
|---|---|---|
| JP | 2018-172051 A | 11/2018 |
| JP | 2019-125894 A | 7/2019 |
| JP | 2020-064603 A | 4/2020 |

* cited by examiner

INFORMATION PROCESSING DEVICE, INFORMATION PROCESSING SYSTEM, AND INFORMATION PROCESSING METHOD

This application is a National Stage Entry of PCT/JP2020/037672 filed on Oct. 5, 2020, the contents of all of which are incorporated herein by reference, in their entirety.

TECHNICAL FIELD

The present disclosure relates to an information processing device, an information processing system, and an information processing method.

BACKGROUND ART

In vehicle control technologies, methods of providing necessary information by improving quality of only camera images and regions important for driving are expected.

For example, Patent Literature 1 discloses an in-vehicle image processing device that performs image processing on an image signal output from an imaging device that captures a side to the rear of a vehicle. Patent Literature 1 also discloses that, in order to ensure visibility of a target to a driver, a width of a margin M1 is set to be wide with respect to a rectangular region R1 set in a target at a short distance from the vehicle, and a width of a margin M2 is set to be narrow with respect to a rectangular region R2 set in the target at a long distance.

CITATION LIST

Patent Literature

Patent Literature 1: Japanese Unexamined Patent Application Publication No. 2019-125894

SUMMARY OF INVENTION

Technical Problem

However, in Patent Literature 1, appropriate margins are not set in consideration of subsequent image processing. Accordingly, if a remote monitoring device performs image recognition on an image on which image processing has been performed after image processing has been performed on a target region including a margin as described in Patent Literature 1 to have a higher image quality than other regions, target recognition accuracy may deteriorate.

The present invention has been made to solve such a problem, and an object of the present invention is to provide an information processing device and the like capable of maintaining recognition accuracy even when subsequent image processing is performed.

Solution to Problem

According to a first aspect of the present disclosure, an information processing device includes:
  an image acquisition unit configured to acquire an image captured by an imaging unit mounted on a vehicle;
  a target detection unit configured to detect a target region including a target in the acquired image;
  a classification identification unit configured to identify classification including a type of the detected target and a size of the detected target region; and
  a region determination unit configured to determine a region obtained by adding a margin corresponding to the identified classification to the target region as an image processing region.

According to a second aspect of the present disclosure, an information processing system includes:
  an image acquisition unit configured to acquire an image captured by an imaging unit mounted on a vehicle;
  a target detection unit configured to detect a target region including a target in the acquired image;
  a classification identification unit configured to identify classification including a type of the detected target and a size of the detected target region; and
  a region determination unit configured to determine a region obtained by adding a margin corresponding to the identified classification to the target region as an image processing region.

According to a third aspect of the present disclosure, an information processing method includes:
  acquiring an image captured by an imaging unit mounted on a vehicle;
  detecting a target region including a target in the acquired image;
  identifying classification including a type of the detected target and a size of the detected target region; and
  determining a region obtained by adding a margin corresponding to the identified classification to the target region as an image processing region.

Advantageous Effects of Invention

According to the present disclosure, it is possible to provide an information processing device, an information processing system, an information processing method, and the like capable of determining an appropriate region on which image processing is performed by adding a margin corresponding to classification of detected targets.

BRIEF DESCRIPTION OF DRAWINGS

FIG. 12 is a block diagram illustrating a hardware configuration example of an information processing device or the like.

EXAMPLE EMBODIMENT

Hereinafter, specific example embodiments to which the present invention is applied will be described in detail with reference to the drawings. However, the present invention is not limited to the following example embodiments. In order to clarify description, the following description and drawings are simplified as appropriate.

First Example Embodiment

Figure 1:
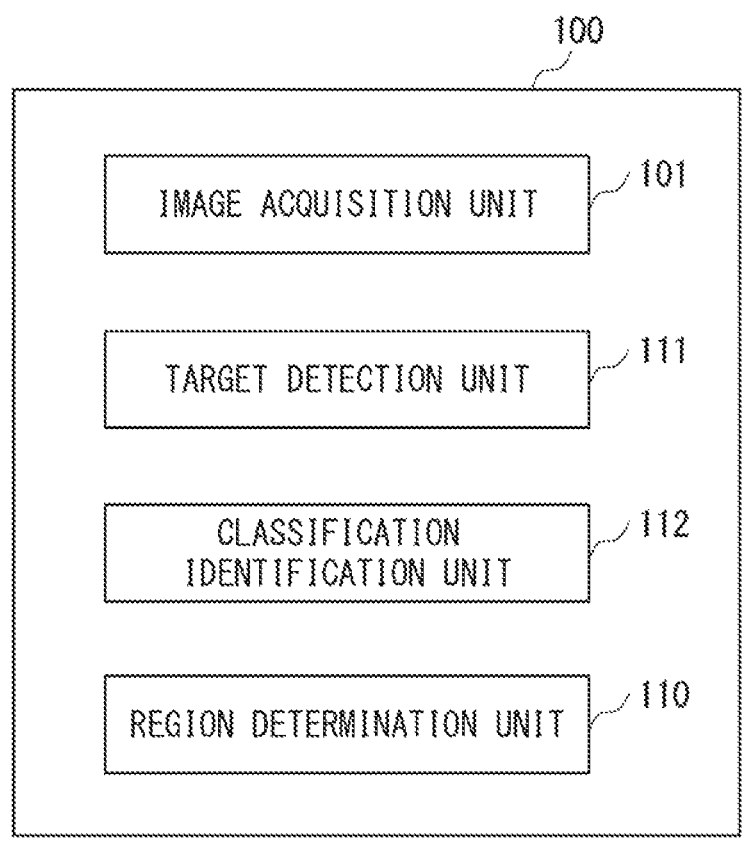
FIG. 1 is a block diagram illustrating a configuration of an information processing device according to a first example embodiment.

FIG. 1 is a block diagram illustrating a configuration of an information processing device according to a first example embodiment.

The information processing device 100 is, for example, a computer mounted on a vehicle. The information processing device 100 includes an image acquisition unit 101 that acquires an image captured by an imaging unit mounted on a vehicle, a target detection unit 111 that detects a target region including a target in the acquired image, a classification identification unit 112 that identifies classification including a type of the detected target and a size of the detected target region, and a region determination unit 110 that determines a region obtained by adding a margin corresponding to the identified classification to the target region as an image processing region.

Figure 2:
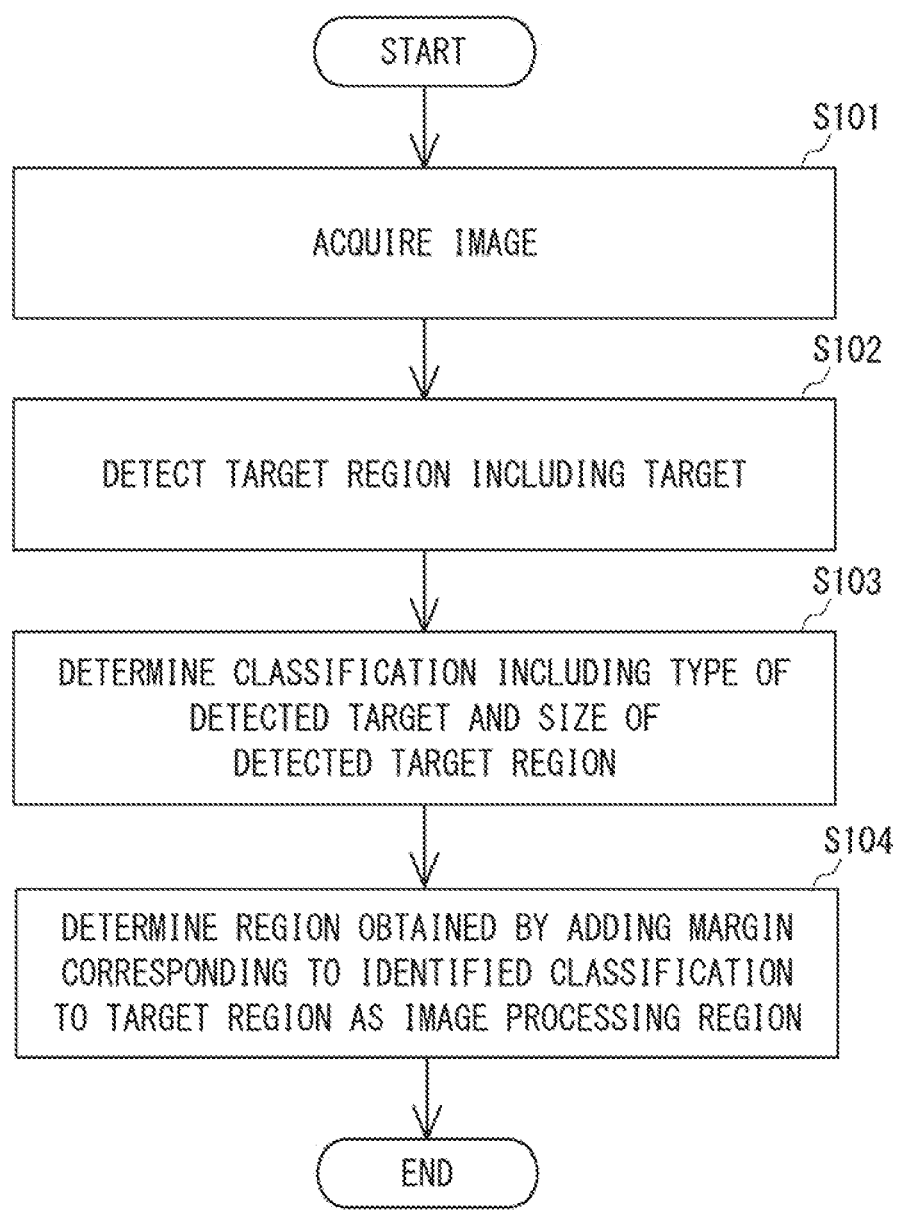
FIG. 2 is a flowchart illustrating an information processing method according to the first example embodiment.

FIG. 2 is a flowchart illustrating an image processing method according to the first example embodiment.

The information processing method includes the following steps. That is, an image captured by an imaging unit mounted on a vehicle is acquired (step S101), a target region including a target in the acquired image is detected (step S102), classification including a type of the detected target and a size of the detected target region is identified (step S103), and a region obtained by adding a margin corresponding to the identified classification to the target region is determined as an image processing region (step S104).

According to the above-described first example embodiment, it is possible to add a margin corresponding to the classification of the detected target and determine an appropriate region to perform image processing.

Second Example Embodiment

Figure 3:
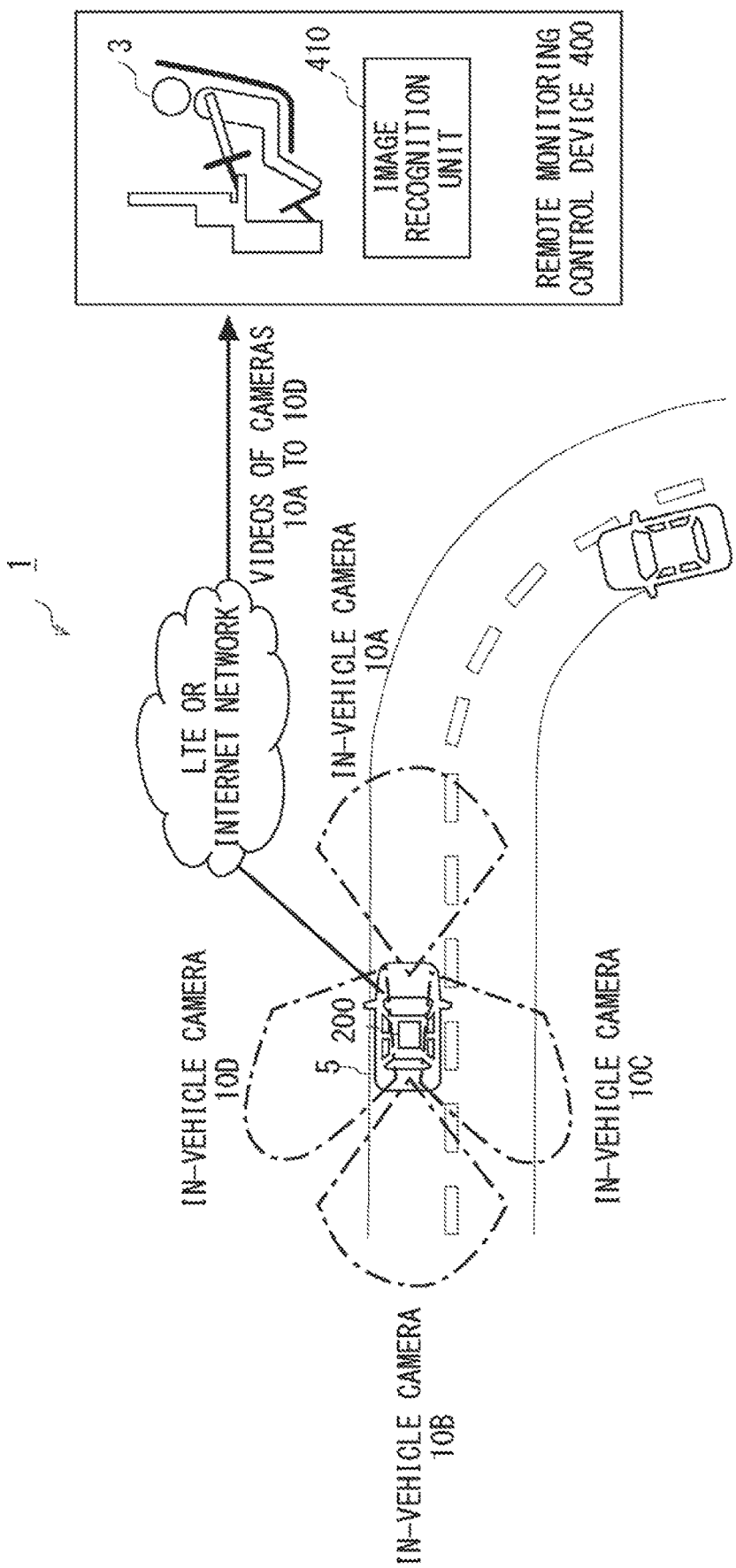
FIG. 3 is a schematic diagram illustrating an overview of a remote monitoring operation system.

FIG. 3 is a schematic diagram illustrating an overview of a remote monitoring operation system.

The remote monitoring operation system remotely operates a vehicle 5 for which a driver is not required from the remote monitoring center. As a method of remotely operating the unmanned driving vehicle 5, images captured by the plurality of in-vehicle cameras 10A to 10D mounted on the vehicle 5 are transmitted to the remote monitoring control device 400 (hereinafter simply referred to as a remote monitoring device.) via a wireless communication network and the Internet. An image processing device 200 mounted on the vehicle performs predetermined image processing on a video from the in-vehicle camera and is used to transmit the video after the image processing to a remote monitoring control device 800 via the network. The remote monitoring control device 800 displays the received image on a display unit such as a monitor, and a remote driver 3 remotely controls the vehicle 5 while viewing the received image on the monitor. In addition to the received image, the remote monitoring control device 400 may display information used for the remote driver 3 to remotely operate the vehicle 5. For example, the remote monitoring control device 800 may display a received image and an analysis result to remote driver 3. The remote operation control device mounted on the vehicle 5 performs bidirectional communication with the remote monitoring control device 400 using a communication method (for example, LTE or 5G) using a mobile phone network. The image recognition unit 410 of the remote monitoring control device 400 can analyze the received video or image and detect and recognize a target using an image recognition engine. When a danger of a vehicle is sensed, the remote monitoring operation system may perform switching to remote control or automatic control while the vehicle under remote monitoring is traveling. That is, a vehicle driven by a person may be temporarily switched to such control, or a driver may be seated in the vehicle.

The in-vehicle camera 10A images in front of the vehicle, the in-vehicle camera 10B images to the rear of the vehicle, the in-vehicle camera 10C images to the right side of the vehicle, and the in-vehicle camera 10D images to the left side of the vehicle. The number of in-vehicle cameras is not limited thereto and may be five or more. The performance of each camera is basically the same, but may be slightly different. A normal driver of a taxi or the like is required to have a second type license and is required to be able to recognize a target (also referred to as an object) in a range visible to a person with eyesight of 0.8 or more. Therefore, a video supplied to a remote driver may also be a video in which a target in a range that a person with eyesight of 0.8 or more can see can be recognized (for example, in the case of a road sign of a general road, the driver can recognize a sign at a distance of 10.66 m). The remote driver is required to visually recognize not only a target but also surrounding information of the target, and such surrounding information can also be transmitted to the remote driver as a relatively high-quality video.

In vehicle remote monitoring and control via a mobile phone network, an available bandwidth fluctuates, and therefore there is a concern of video quality deteriorating due to a lack of a band. Therefore, when a bandwidth decreases, only an important region of a captured image is sent with high quality, and the other regions are sent with low image quality to the remote monitoring center, and thus accuracy of video analysis in the remote monitoring center can be maintained. In this way, it is possible to maintain quality of experience (QoE) when the band decreases.

Figure 4:
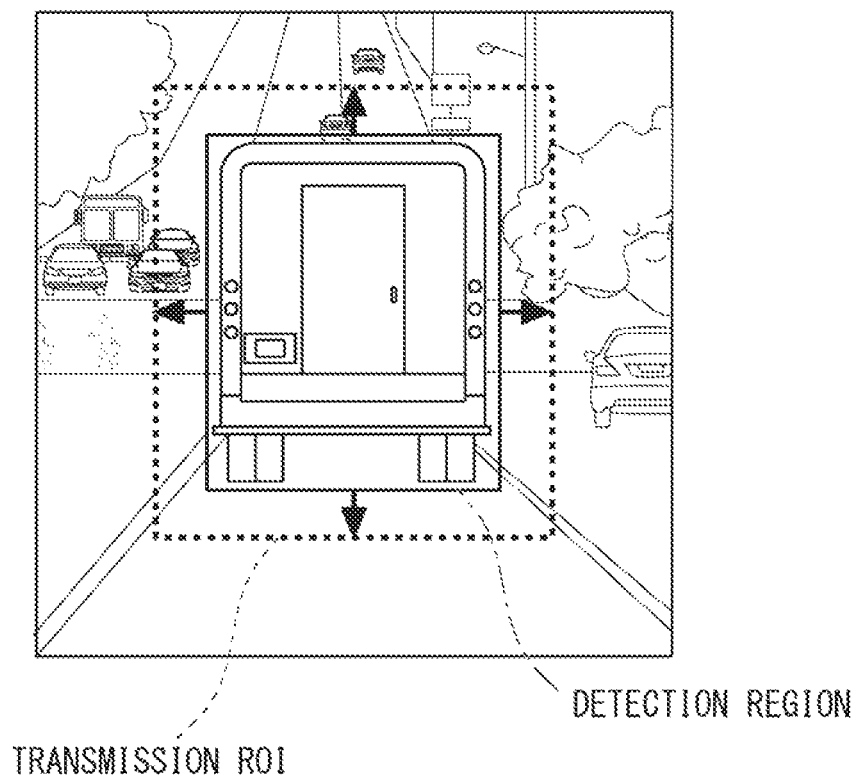
FIG. 4 is a diagram illustrating an example of an image captured by an in-vehicle camera of a vehicle.

FIG. 4 is a diagram illustrating an example of an image captured by the in-vehicle camera of the vehicle.

FIG. 4 illustrates an example of an image obtained by imaging the front of the vehicle 5 by the in-vehicle camera 10A illustrated in FIG. 3. The detected target is surrounded by a bounding box (this region is also referred to as a region of interest (ROI)). Here, as the ROI, objects that can affect the driving of the vehicle, that is, other vehicles, pedestrians, bicycles, traffic lights, traffic signs, and the like are detected. By improving the image quality of the ROI in the image, reducing the image quality of other regions of the image, and sending the image to the remote monitoring center, it is possible to maintain the video analysis accuracy and the recognition accuracy in the remote monitoring center while reducing the bandwidth used.

In general, when the recognition accuracy of a target of the image recognition engine is increased, a detection region that is tight with respect to the target may be set. As illustrated in FIG. 4, if the margin of the detection region surrounding the target (here, a vehicle) is too small, there is concern of recognition accuracy of a video at the remote monitoring center deteriorating when different image processing (for example, encoding, various compression processes, and an image quality reduction process) are performed on the detection region and the other regions. For example, when an image of a vehicle with a small margin is transmitted to the remote monitoring device, the vehicle may not be recognized as a vehicle. This suggests that information regarding a surrounding region of a target is also important in target video analysis. For example, in order to recognize a vehicle, it is considered that information regarding a surrounding region such as a road is also important. Accordingly, in order to maintain the target recognition accuracy with respect to image data after image processing at a certain level or more as compared with target recognition accuracy with respect to image data before the image processing, it is necessary to determine a region (in FIG. 4, the transmission ROI) in which an optimal margin is set.

Here, a method of determining an optimal margin for each target detection region in advance will be described.

An optimal margin is derived according to a type of target (for example, a vehicle, a person, or a bicycle) and a class of the size of the target in the image (for example, large, medium, small).

Figure 5:
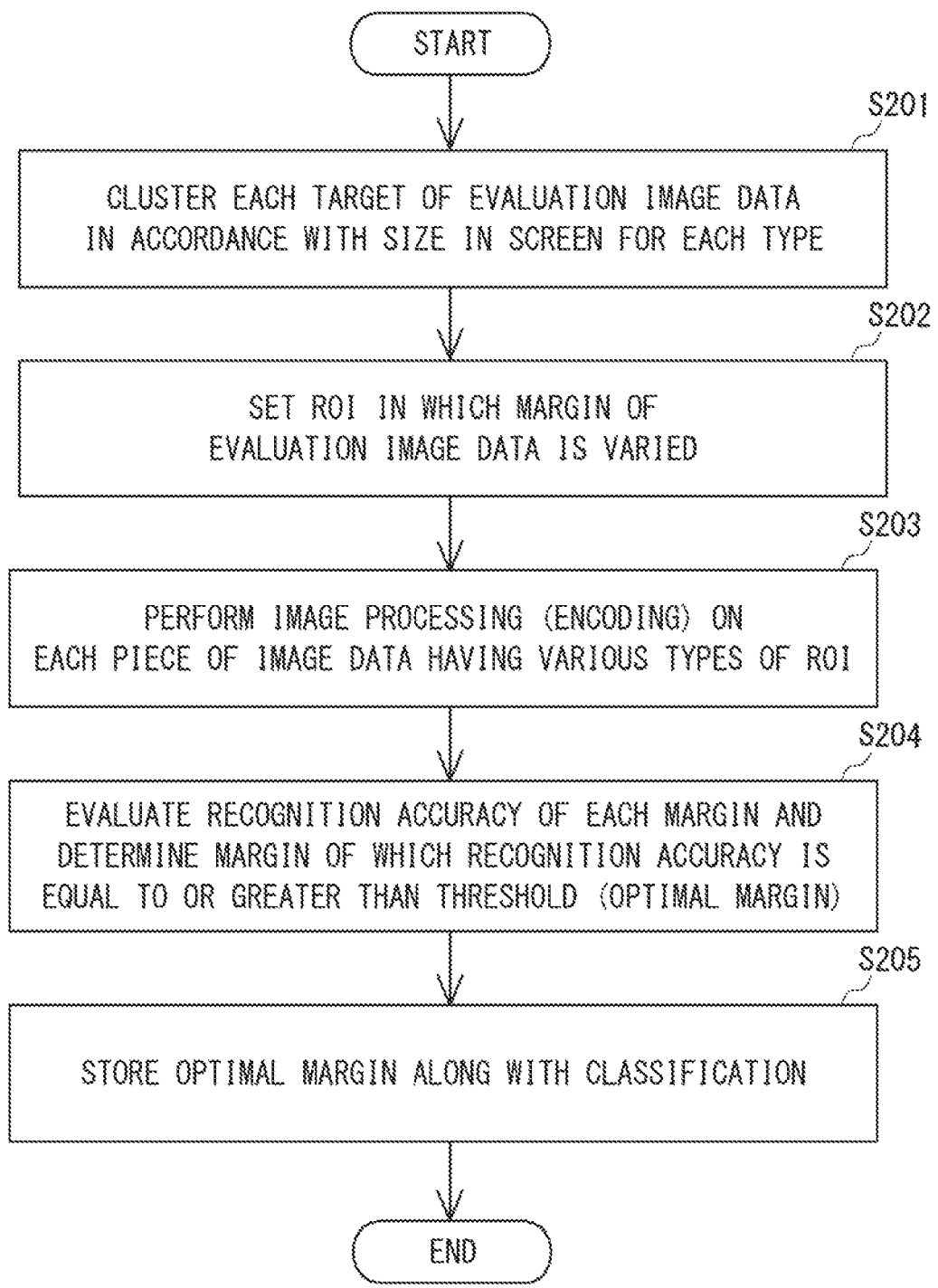
FIG. 5 is a flowchart illustrating an optimal margin determination method.

FIG. 5 is a flowchart illustrating an optimal margin determination method.

The training image data is clustered for each type of target and each class of a size of the target occupying the image (step S201). The size of the target may be indicated by a ratio of a region of the target (detection region) occupying a screen or may be indicated by an area because an angle of field of an in-vehicle camera that captures the training image data is fixed. This process is also called clustering of training image data. For example, the size of the target is classified into three classes (large, medium, and small) by K-means or the like. A class closest to a large, medium, or small reference point (average size in each class) is defined as a target class.

Subsequently, the training image data is duplicated and the ROI in which various margins are set is set as a region where image quality is to be improved in each duplicated image data, and the other regions are set as regions where image quality is to be reduced (step S202). Such image data (a plurality of pieces of ROI image data) is subjected to different types of image processing for each set region (step S203). The different types of image processing are an image quality improvement process and an image quality reduction process. The image quality reduction process may include, for example, a contrast reduction process, resolution reduction process, a number-of-gradations reduction process, a number-of-colors reduction process, or a dynamic range reduction process. The image quality improvement process may also include a contrast reduction process, a resolution reduction process, a number-of-gradations reduction process, a number-of-colors reduction process, or a dynamic range reduction process, but is various types of image processing in which the image quality is higher than that in the image quality reduction process. Thereafter, video analysis is performed on the ROI image data subjected to the image processing, and the target recognition accuracy is evaluated. In this evaluation of recognition accuracy, an image recognition engine that is the same as or similar to an image recognition engine used in the server computer located in the remote monitoring center can be used. A margin of which the recognition accuracy is equal to or greater than a threshold is determined as an optimal margin (step S204). The optimal margin is stored in a storage unit (the storage unit 250 in FIG. 8) of each image processing device along with the foregoing classification (Type of target and size of target in image) (step S205).

Figure 6:
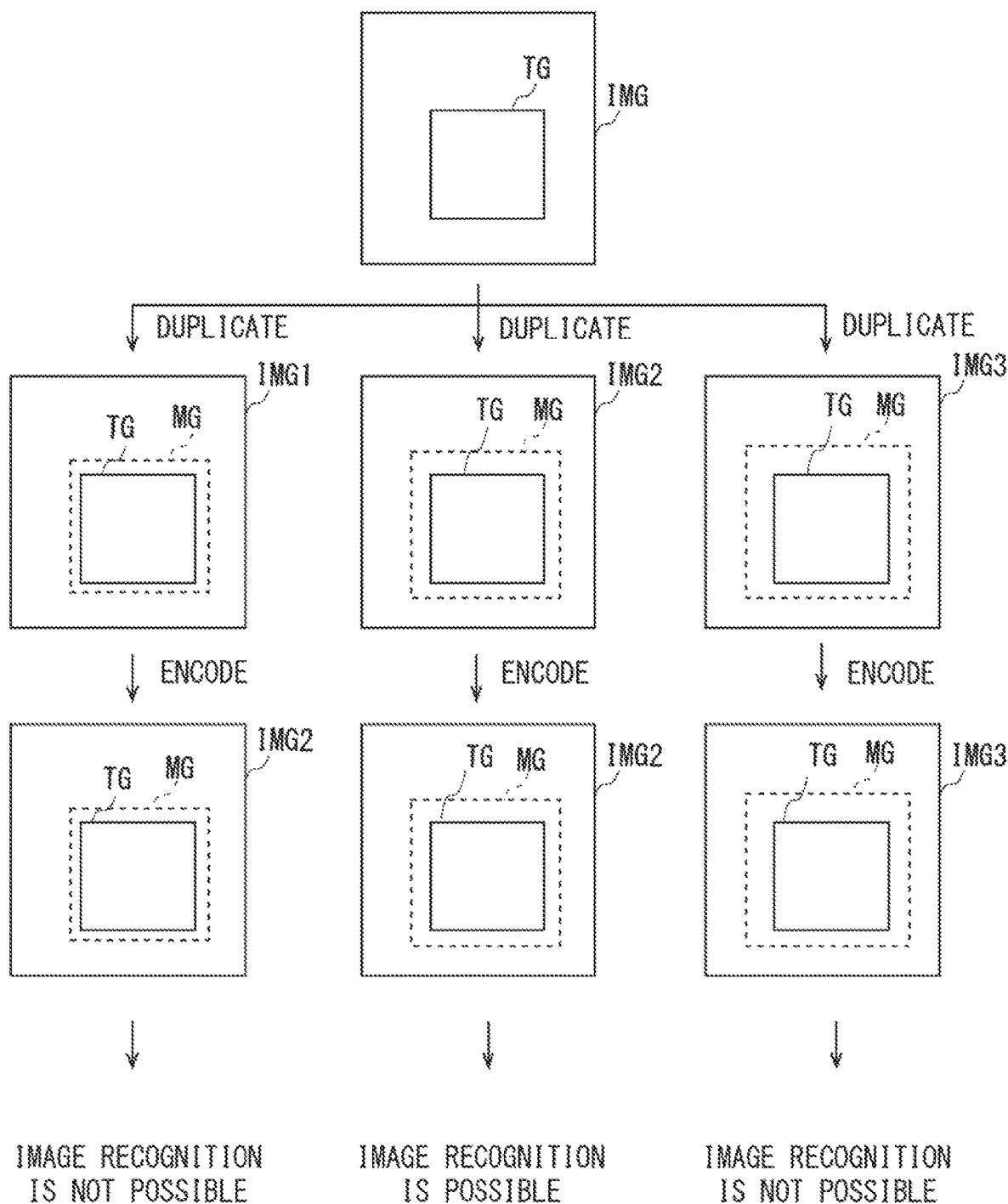
FIG. 6 is a diagram illustrating evaluation of image recognition of certain evaluation image data.

FIG. 6 is a diagram illustrating an accuracy result of image recognition of certain training image data.

In the training image data IMG, one target (for example, the type is "car" and the target size is "small") is detected before image processing (that is, a correct answer is labeled.). The training image data IMG is duplicated, and duplicated training image data IMG1, IMG2, and IMG3 are set in different margins (for example, margins of 5% for IMG1, 10% for IMG2, and 15% for IMG3.). Image processing (encoding) is performed on each piece of image data to improve the image quality of a region including a margin in the image and to reduce the image quality of other regions. Image recognition is performed on each encoded image. In this example, it is assumed that image recognition can be appropriately performed in IMG2 in which the margin of 10% is set, and image recognition can be appropriately performed in IMG1 in which the margin of 5% is set and IMG3 in which the margin of 15% is set.

Figure 7:
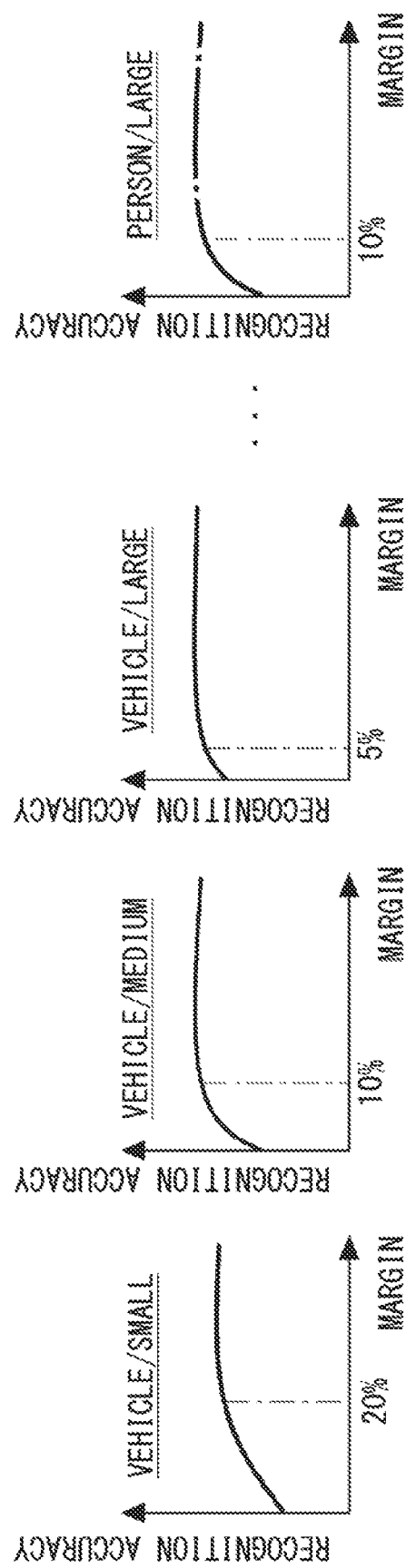
FIG. 7 is a diagram illustrating recognition accuracy of a target with respect to an ROI margin for each type of target and each size class of the target in an image.

In this way, a recognition success or failure of various pieces of training image data of the same classification (in this example, the type is "car" and the target size is "small") is examined, and the averaged recognition accuracy is calculated (a graph of "car/small" in FIG. 7). The target recognition accuracy in which the training image data before the image processing was used was compared with the target recognition accuracy in which the training image data after the image processing was used. For many pieces of training image data of other classifications, the recognition accuracy was similarly evaluated for each margin as illustrated in FIG. 7.

FIG. 7 illustrates the target recognition accuracy with respect to the ROI margin for each class of the type of a target and the size of the target in the image. The horizontal axis represents an ROI margin (%), and the vertical axis represents target recognition accuracy. In this example, a margin of which the recognition accuracy peaks is set as an optimal margin. When the classification, that is, the type of target and the size of the target occupied in the image, is "car/small", an optimal margin is 20%. Similarly, the optimal margin is 10% in the case of "vehicle/medium" and is 5% in the case of "vehicle/large." In the case of "person/large," the optimal margin is 10%. For the car, the optimal margin tends to be narrowed as the size on a screen increases.

Although only the types of "car" and "person" are illustrated in FIG. 7, various other types of targets may also be evaluated. The size of the target in the image may be evaluated by being subdivided into not only three classes of "large, medium, and small" but also more classes. The optimal margin is assumed to have maximum accuracy (peak value), but is not limited thereto. Any margin may be set as the optimal margin as long as the accuracy is equal to or greater than a threshold. Any threshold of the recognition accuracy can be set in consideration of the inhibition of a use band in the image transmission system and required recognition accuracy. In the foregoing example, the classifications are "the types of target" and "the classes of the size of the target in the image," but another classification may be added. For example, a "traveling environment," "target orientation," a "time zone," and "weather" may be added. Examples of the traveling environment include a highway and a residential region. Examples of the time zone include daytime, evening, and nighttime. Examples of the weather include sunny, cloudy, rainy, and snowy.

Figure 8:
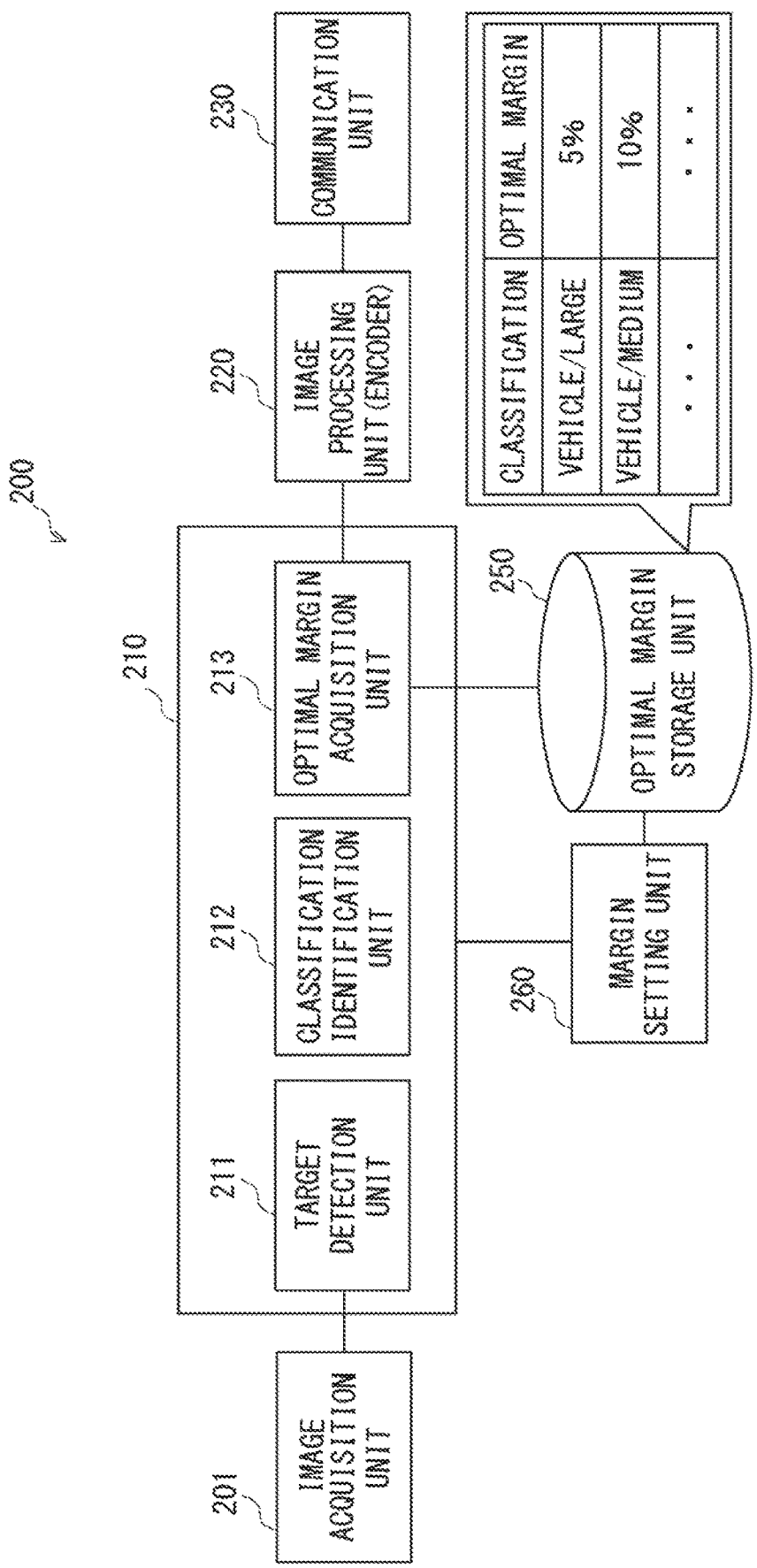
FIG. 8 is a block diagram illustrating a configuration of an image processing device according to a second example embodiment.

FIG. 8 is a block diagram illustrating a configuration of an image processing device according to a second example embodiment.

The image processing device 200 is an information processing device configured with a computer. The image processing device 200 includes an image acquisition unit 201, an ROI determination unit 210, an optimal margin storage unit 250, an encoder 220, and a communication unit 230. The ROI determination unit 210 includes a target detection unit 211, a classification identification unit 212, and an optimal margin acquisition unit 213. Furthermore, the image processing device 200 may also include a margin setting unit 260. Alternatively, the image processing device 200 may include a margin setting unit implemented by a computer different.

The image acquisition unit 201 acquires an image (frame) captured by an imaging unit such as an in-vehicle camera. The ROI determination unit 210 detects a target of the acquired image and determines an ROI which is an appropriate region from the viewpoint of image recognition. Specifically, the target detection unit 211 detects a target in the image from the image acquisition unit 201. Any target to be detected can be set in advance. Here, a target (for example, a person, a vehicle, a motorcycle, a bicycle, a truck, a bus, or the like.) that may affect driving of a vehicle is set. The target detection unit 211 can also identify the type of target (for example, a person, a vehicle, a bicycle, a motorcycle, or the like) using a known image recognition technology. The image acquisition unit 201 can continuously acquire the video captured by the imaging unit at a predetermined frame rate as image frames.

The classification identification unit 212 identifies classification including the type of detected target and the size of the detected target region. The size of the target region is calculated from the area of a bounding box, and a class (for example, "large," "medium," or "small") having a size corresponding to the calculated area is identified.

The optimal margin acquisition unit 213 acquires the optimal margin corresponding to the identified classification from the optimal margin storage unit 250. As described above, the optimal margin storage unit 250 stores the optimal margin for each classification evaluated in advance. As a result, it is possible to realize a low delay and acquire an optimal margin. The optimal margin storage unit 250 may be inside the image processing device 200 or may be in an external storage device connected to the image processing device 200 via a network.

In this way, the ROI determination unit 210 can determine an appropriate ROI by adding the optimal margin corresponding to each classification to the target region. The ROI determined in this way is appropriately set so that the target recognition accuracy can be maintained at a certain level or more even when subsequent image processing (encoding) is performed.

The encoder 220 performs image processing to improve the image quality of the ROI and reduce the image quality of other regions in the image. In the image quality improvement process, a compression process is performed at a lower compression rate than in the image quality reduction region. The image quality reduction process may include a contrast reduction process, a resolution reduction process, a number-of-gradations reduction process, a color number reduction process, or a dynamic range reduction process. The image quality improvement process may also include a contrast reduction process, a resolution reduction process, a number-of-gradations reduction process, a number-of-colors reduction process, or a dynamic range reduction process, but is various types of image processing in which the image quality is higher than that in the image quality reduction process.

The communication unit 230 is a communication interface with a network. The communication unit 230 is used to communicate with other network node devices (for example, the information processing device on a remote monitoring center side) included in the image processing system. The communication unit 230 may be used to perform wireless communication. For example, the communication unit 230 may be used to perform wireless LAN communication defined in IEEE 802.11 series, or mobile communication defined in 3rd Generation Partnership Project (3GPP), 4G, 5G, or the like. The communication unit 230 can also be connected to be able to communicate with to a smartphone via Bluetooth (registered trademark) or the like. The communication unit 230 can be connected to a camera via a network.

The communication unit 230 wirelessly transmits the image data subjected to the image processing to the remote monitoring center. The communication unit 230 wirelessly transmits the encoded image data to the remote monitoring control device via a mobile network such as LTE or 5G.

The margin setting unit 260 identifies accuracy with which the remote monitoring device monitoring the vehicle recognizes the target according to the type of detected target and the size of the detected target region, and sets a margin corresponding to the type of detected target and the size of the target region according to the identified accuracy. The margin setting unit 260 sets the optimal margin illustrated in FIG. 5.

Specifically, the margin setting unit 260 collects training image data of which the target and the type is identified by the target detection unit 211 with respect to an image from the image acquisition unit 201. Next, the margin setting unit 260 clusters the training image data according to the classification including a type of target and the size of the target in a detection target image. The margin setting unit 260 sets a region obtained by adding various margins to a region including a target in the training image data as an ROI. For example, as illustrated in FIG. 6, a plurality of margin regions that gradually increase can be set for the detection region. The margin setting unit 260 duplicates original image data for each of various ROIs and performs image processing on each duplicated image data such that the ROI has high image quality and the other regions have low image quality. The margin setting unit 260 recognizes the image data after the image processing using the image recognition engine. The margin setting unit 260 evaluates the recognition accuracy for each margin based on image recognition results of many pieces of image data. The margin setting unit 260 sets a margin at which the recognition accuracy is equal to or greater than the threshold as an optimal margin. The margin setting unit 260 stores the set optimal margin in the margin storage unit 250 along with the classification.

Figure 9:
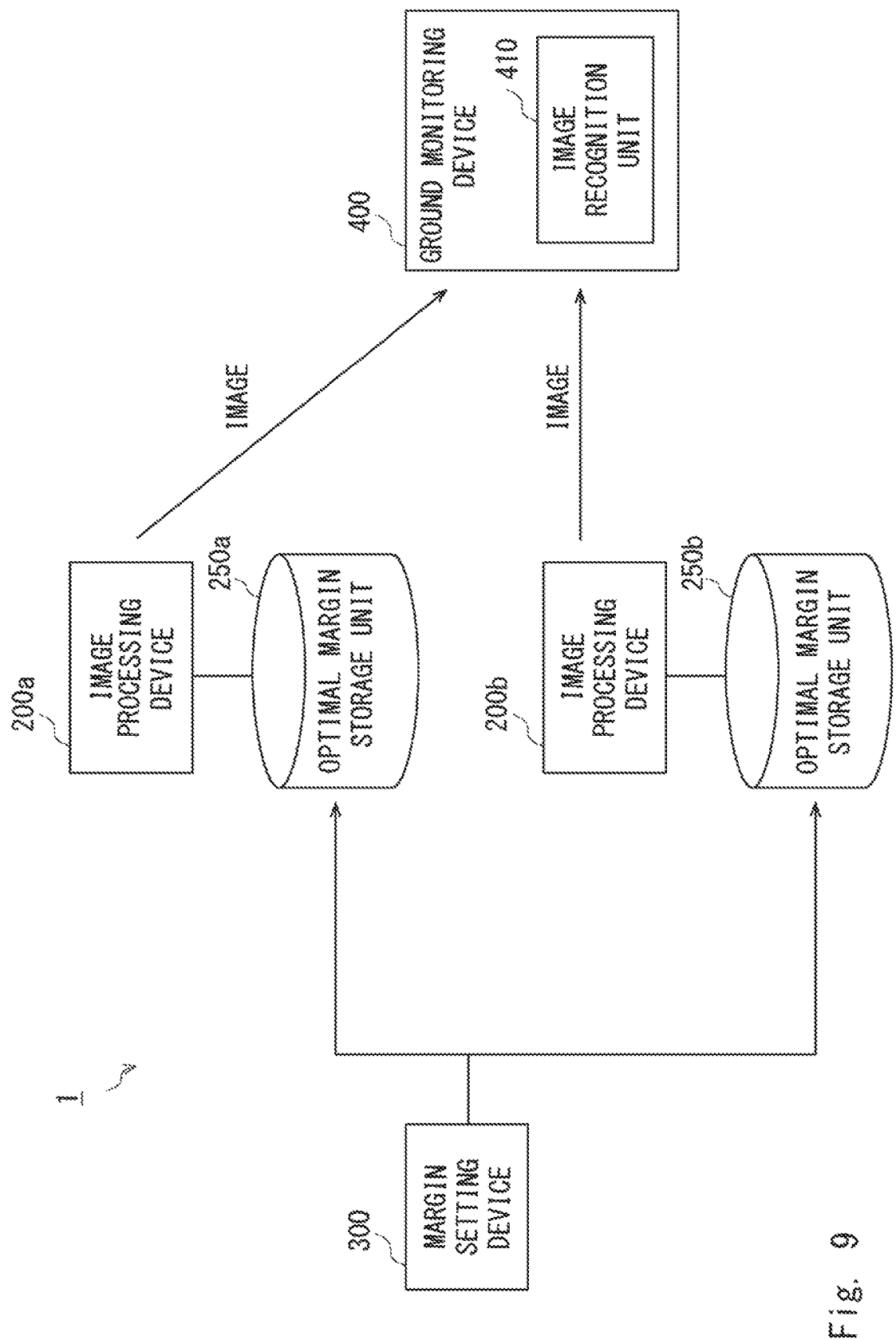
FIG. 9 is a diagram illustrating an example in which an optimal margin set by a margin setting device is loaded to the same type of image processing device.

As described above, the margin setting unit may be provided inside the image processing device 200 or may be provided as an information processing device implemented by another computer. As illustrated in FIG. 9, the margin setting device 300 may be implemented with a computer different from the image processing device 200. An image recognition engine used by the image recognition unit 410 of the remote monitoring device is installed in the margin setting device 300. In this case, the optimal margin set for each classification by the margin setting device 300 is stored in optimal margin storage units 250*a* and 250*b* of image processing devices 200*a* and 200*b* mounted on vehicles of the same vehicle model. The vehicles of the same vehicle model here refer to a vehicle of the same shape, a vehicle with the same size, a similar vehicle, or a vehicle with a similar size having substantially the same angle of field from the imaging unit.

Figure 10:
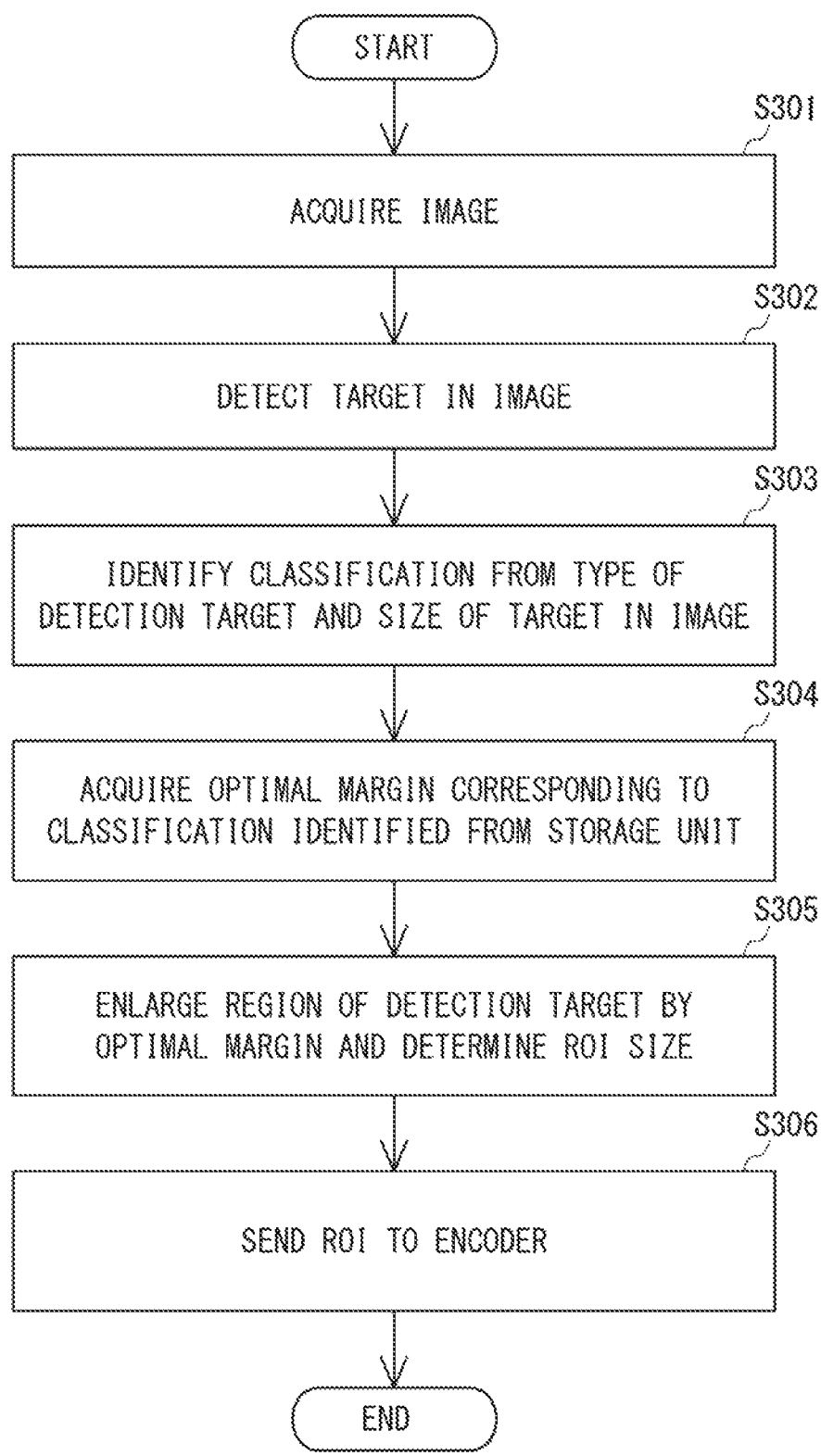
FIG. 10 is a flowchart illustrating an image processing method according to the second example embodiment.

FIG. 10 is a flowchart illustrating an image processing method according to the second example embodiment.

Here, an operation of the ROI determination unit 210 will be described. An image is acquired (step S301). A target in the image is detected (step S302). The classification is identified from a type of detection target and the size of a target in the image (step S303). The optimal margin corresponding to the classification identified from the storage unit 250 is acquired (step S304). A detection target region is enlarged by the optimal margin, and a ROI size is determined (step S305). The ROI is sent to the encoder 220 (step S306).

Thereafter, the encoder 220 encodes the image data to improve the image quality of the ROI and reduce the image quality of the other regions. Further, the communication unit 230 wirelessly transmits the encoded image data to the remote monitoring device 400.

The image processing device according to the above-described second example embodiment can acquire the optimal margin for each classification of the detected target and determine an appropriate ROI. By determining the optimal margin for each classification in advance, it is possible to implement a reduction in delay and maintenance of target recognition accuracy in automated driving and the like.

Figure 11:
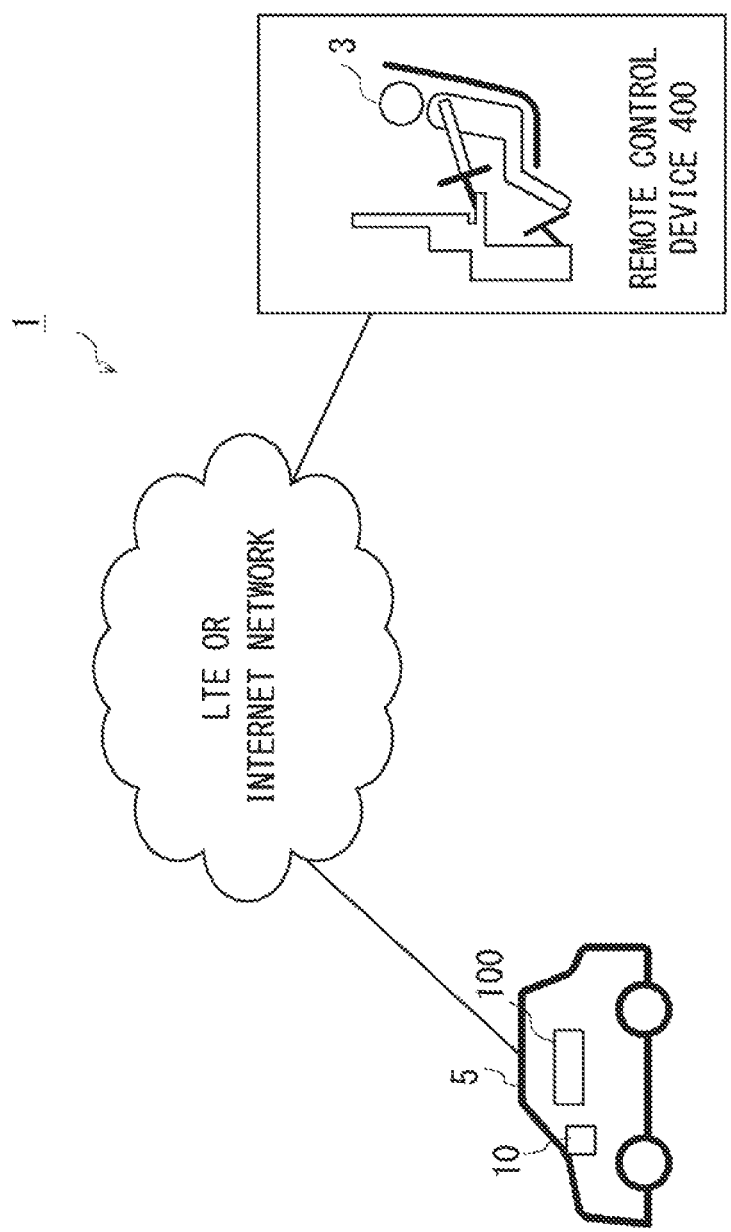
FIG. 11 is a block diagram illustrating a configuration of an information processing system according to another example embodiment.

FIG. 11 is a block diagram illustrating a configuration of an information processing system according to another example embodiment.

The information processing system includes the vehicle 5 on which the information processing device 100 illustrated in FIG. 1 is mounted, and the remote monitoring control device 400 connected to be able to communicate with the information processing device 100 via a network. The information processing device 100 includes the image acquisition unit 101 that acquires an image captured by the imaging unit 10 mounted on the vehicle 5, the target detection unit 111 that detects a target region including a target in the acquired image, the classification identification unit 112 that identifies classification including a type of the detected target and a size of the detected target region, and the region determination unit 110 that determines a region obtained by adding a margin corresponding to the identified classification to the target region as an image processing region. As illustrated in FIG. 8, the information processing device 100 may further include an image processing unit (encoder) 220 that performs image processing based on the determined region, and the communication unit 230 that transmits the image data subjected to the image processing to the remote monitoring device 400.

Although the information processing device 100 including the image acquisition unit 101, the target detection unit 111, the classification identification unit 112, and the region determination unit 110 has been described in FIG. 11, the information processing device may be implemented as a system mounted on each different device. For example, a device on which the image acquisition unit 101 and the target detection unit 111 are mounted and a device including the classification identification unit 112 and the region determination unit 110 may be configured to communicate with each other via a network.

The information processing system can add a margin corresponding to the classification of the detected target and determine an appropriate region on which image processing is performed. The information processing system can implement remote monitoring and remote control of a vehicle by performing image processing on an appropriate region that may affect driving of the vehicle while inhibiting the use band and transmitting image data after the image processing to the remote monitoring control device.

In the above-described example embodiments, in the information processing system and the remote monitoring operation system, the remote driver 3 remotely operates the unmanned driving vehicle 5, but the present invention is not limited thereto. For example, a general control device that generally controls the unmanned driving vehicle 5 may be provided. The general control device may generate information used for the unmanned driving vehicle 5 to autonomously drive based on the information acquired from the unmanned driving vehicle 5, and the unmanned driving vehicle 5 may operate according to the information.

Figure 12:
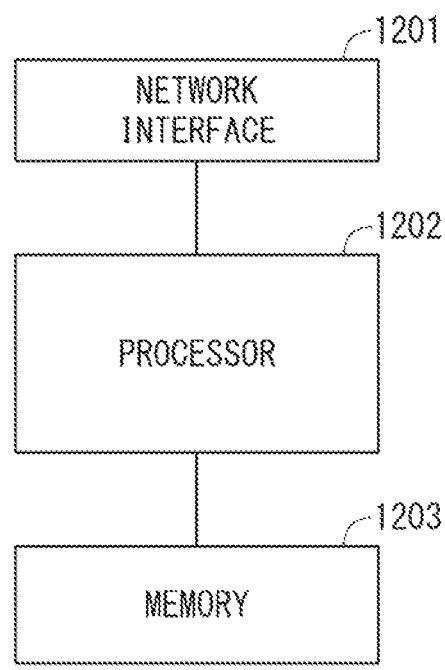

FIG. 12 is a block diagram illustrating a hardware configuration example of the information processing device 100, the image processing device 200, the margin setting device 300, and the remote monitoring control device 400 (hereinafter referred to as the information processing device 100 and the like.). Referring to FIG. 12, the information processing device 100 and the like include a network interface 1201, a processor 1202, and a memory 1203. The network interface 1201 is used to communicate with other network node devices included in the communications system. The network interface 1201 may be used to perform wireless communications. For example, the network interface 1201 may be used to perform wireless LAN communication defined in IEEE 802.11 series or mobile communication defined in 3rd Generation Partnership Project (3GPP). Alternatively, the network interface 1201 may include, for example, a network interface card (NIC) conforming to IEEE 802.3 series.

The processor 1202 performs a process of the information processing device 100 and the like described using the flowchart or sequence in the above-described example embodiments by reading and executing software (a computer program) from the memory 1203. The processor 1202 is, for example a microprocessor, a micro processing unit (MPU), or a central processing unit (CPU). The processor 1202 may include a plurality of processors.

The memory 1203 is configured with a combination of a volatile memory (a random access memory (RAM)) and a nonvolatile memory (read only memory (ROM)). The memory 1203 may include a storage located away from the processor 1202. In this case, the processor 1202 may access the memory 1203 via an I/O interface (not illustrated). For example, the memory 1203 is not necessarily a part of a device, and may be an external storage device or a cloud storage connected to the computer device 500 via a network.

In the example of FIG. 12, the memory 1203 is used to store a software module group. The processor 1202 can perform a process of the information processing device 100 and the like described in the above-described example embodiments by reading and executing these software module groups from the memory 1203.

As described with reference to FIG. 12, each of the processors included in the information processing device 100 and the like executes one or a plurality of programs including a command group for causing a computer to perform the algorithm described with reference to the drawings.

Each of the processes described with reference to the above-described flowcharts may not necessarily be processed in time series in the procedures described as the flowcharts, and include processes executed in parallel or individually (for example, parallel processes or processes by an object). The program may be processed by one CPU, or may be processed in a distributed manner by a plurality of CPUs.

In the above-described example, the program can be stored using various types of non-transitory computer-readable media to be supplied to a computer. The non-transitory computer-readable media include various types of tangible storage media. Examples of the non-transitory computer readable media include a magnetic recording medium, a magneto-optical recording medium (for example, a magneto-optical disc), a CD-ROM (read only memory), a CD-R, a CD-R/W, and a semiconductor memory. The magnetic recording medium may be, for example, a flexible disk, a magnetic tape, or a hard disk drive. The semiconductor memory may be, for example, a mask ROM, a programmable ROM (PROM), an erasable PROM (EPROM), a flash ROM, or a random access memory (RAM). The program may be supplied to a computer by various types of transitory computer-readable media. Examples of the transitory computer-readable media include electric signals, optical signals, and electromagnetic waves. The transitory computer-readable medium can provide the program to the computer via a wired communication line such as an electric wire and optical fibers or a wireless communication line.

The present invention is not limited to the foregoing example embodiments, and can be appropriately changed without departing from the gist. The plurality of examples described above can be implemented in appropriate combination.

Some or all of the above example embodiments may be described as the following supplementary notes, but are not limited to the following.

Supplementary Note 1

An information processing device including:
an image acquisition unit configured to acquire an image captured by an imaging unit mounted on a vehicle;
a target detection unit configured to detect a target region including a target in the acquired image;
a classification identification unit configured to identify classification including a type of the detected target and a size of the detected target region; and
a region determination unit configured to determine a region obtained by adding a margin corresponding to the identified classification to the target region as an image processing region.

Supplementary Note 2

The information processing device according to Supplementary Note 1, in which the margin is set so that, even when image processing is performed on an image in which the region obtained by adding the margin corresponding to the identified classification is set, recognition accuracy of the image is equal to or greater than a threshold.

Supplementary Note 3

The information processing device according to Supplementary Note 1 or 2, in which the region determination unit determines the region obtained by adding the margin to the target region as an image processing region with higher image quality than other regions.

Supplementary Note 4

The information processing device according to any one of Supplementary Notes 1 to 3, further including a margin setting unit configured to
identify accuracy with which a remote monitoring device monitoring the vehicle recognizes the target in accordance with the type of the detected target and the size of the detected target region, and
set a margin corresponding to the type of the detected target and the size of the detected target region in accordance with the identified accuracy.

Supplementary Note 5

The information processing device according to Supplementary Note 4, in which the margin setting unit
identifies classification of training image data in which a type of target included in an image is determined in accordance with the determined type of target and size of the determined target,
sets a region obtained by adding a margin to the target region including a target included in the training image data,
identifies accuracy with which the remote monitoring device recognizes the target when image processing is performed on the training image data such that a region to which the margin is added has higher image quality than other regions, and
sets a margin in which the recognition accuracy is equal to or greater than a threshold as a margin corresponding to the classification.

Supplementary Note 6

The information processing device according to Supplementary Note 5, in which
a region to which a different margin is added to each of the plurality of pieces of training image data is set,
accuracy with which the remote monitoring device recognizes the target is identified when image processing is performed on each of the plurality of pieces of training image data to which the different margin is added, and
a margin in which the recognition accuracy is equal to or greater than a threshold is set as a margin corresponding to the classification.

Supplementary Note 7

The information processing device according to any one of Supplementary Notes 1 to 5, further including a storage unit configured to store a margin corresponding to the classification.

Supplementary Note 8

An information processing system including:
an image acquisition unit configured to acquire an image captured by an imaging unit mounted on a vehicle;
a target detection unit configured to detect a target region including a target in the acquired image;

a classification identification unit configured to identify classification including a type of the detected target and a size of the detected target region; and a region determination unit configured to determine a region obtained by adding a margin corresponding to the identified classification to the target region as an image processing region.

Supplementary Note 9

The information processing system according to Supplementary Note 8, in which the margin is set so that, even when image processing is performed on an image in which the region obtained by adding the margin corresponding to the identified classification is set, recognition accuracy of the image is equal to or greater than a threshold.

Supplementary Note 10

The information processing system according to Supplementary Note 8 or 9, in which the region determination unit determines the region obtained by adding the margin to the target region as an image processing region with higher image quality than other regions.

Supplementary Note 11

The information processing system according to any one of Supplementary Notes 8 to 10, further including a margin setting device configured to
 identify accuracy with which a remote monitoring device monitoring the vehicle recognizes the target in accordance with the type of the detected target and the size of the detected target region, and
 set a margin corresponding to the type of the detected target and the size of the detected target region in accordance with the identified accuracy.

Supplementary Note 12

The information processing system according to Supplementary Note 11, in which the margin setting device
 identifies classification of training image data in which a type of target included in an image is determined in accordance with the determined type of target and size of the determined target,
 sets a region obtained by adding a margin to the target region including a target included in the training image data,
 identifies accuracy with which the remote monitoring device recognizes the target when image processing is performed on the training image data such that a region to which the margin is added has higher image quality than other regions, and
 sets a margin in which the recognition accuracy is equal to or greater than a threshold as a margin corresponding to the classification.

Supplementary Note 13

The information processing system according to Supplementary Note 12, in which the margin setting device
 sets a region to which a different margin is added to each of the plurality of pieces of training image data,
 identifies accuracy with which the remote monitoring device recognizes the target when image processing is performed on each of the plurality of pieces of training image data to which the different margin is added, and
 sets a margin in which the recognition accuracy is equal to or greater than a threshold as a margin corresponding to the classification.

Supplementary Note 14

The information processing system according to any one of Supplementary Notes 8 to 12, further including a storage unit configured to store a margin corresponding to the classification.

Supplementary Note 15

An information processing method including:
 acquiring an image captured by an imaging unit mounted on a vehicle;
 detecting a target region including a target in the acquired image;
 identifying classification including a type of the detected target and a size of the detected target region; and
 determining a region obtained by adding a margin corresponding to the identified classification to the target region as an image processing region.

Supplementary Note 16

The information processing method according to Supplementary Note 15, in which the margin is set so that, even when image processing is performed on an image in which the region obtained by adding the margin corresponding to the identified classification is set, recognition accuracy of the image is equal to or greater than a threshold.

Supplementary Note 17

The information processing method according to Supplementary Note 15 or 16, further including determining the region obtained by adding the margin to the target region as an image processing region with higher image quality than other regions.

Supplementary Note 18

The information processing method according to any one of Supplementary Notes 15 to 17, further including:
 identifying accuracy with which a remote monitoring device monitoring the vehicle recognizes the target in accordance with the type of the detected target and the size of the detected target region; and
 setting a margin corresponding to the type of the detected target and the size of the detected target region in accordance with the identified accuracy.

Supplementary Note 19

The information processing method according to Supplementary Note 18, further including:
 identifying classification of training image data in which a type of target included in an image is determined in accordance with the determined type of target and size of the determined target;
 setting a region obtained by adding a margin to the target region including a target included in the training image data;

identifying accuracy with which the remote monitoring device recognizes the target when image processing is performed on the training image data such that a region to which the margin is added has higher image quality than other regions; and setting a margin in which the recognition accuracy is equal to or greater than a threshold as a margin corresponding to the classification.

Supplementary Note 20

The information processing method according to Supplementary Note 19, further including:
setting a region to which a different margin is added to each of the plurality of pieces of training image data;
identifying accuracy with which the remote monitoring device recognizes the target when image processing is performed on each of the plurality of pieces of training image data to which the different margin is added; and
setting a margin in which the recognition accuracy is equal to or greater than a threshold as a margin corresponding to the classification.

Supplementary Note 21

A program causing a computer to perform:
acquiring an image captured by an imaging unit mounted on a vehicle;
detecting a target region including a target in the acquired image;
identifying classification including a type of the detected target and a size of the detected target region; and
determining a region obtained by adding a margin corresponding to the identified classification to the target region as an image processing region.

Supplementary Note 22

The program according to Supplementary Note 21, in which the margin is set so that, even when image processing is performed on an image in which the region obtained by adding the margin corresponding to the identified classification is set, recognition accuracy of the image is equal to or greater than a threshold.

Supplementary Note 23

The program according to Supplementary Note 21 or 22 causing the computer to perform determining the region obtained by adding the margin to the target region as an image processing region with higher image quality than other regions.

Supplementary Note 24

The program according to any one of Supplementary Note 21 to 23 causing the computer to perform:
identifying accuracy with which a remote monitoring device monitoring the vehicle recognizes the target in accordance with the type of the detected target and the size of the detected target region; and
setting a margin corresponding to the type of the detected target and the size of the detected target region in accordance with the identified accuracy.

Supplementary Note 25

The program according to Supplementary Note 24 causing the computer to perform:
identifying classification of training image data in which a type of target included in an image is determined in accordance with the determined type of target and size of the determined target;
setting a region obtained by adding a margin to the target region including a target included in the training image data;
identifying accuracy with which the remote monitoring device recognizes the target when image processing is performed on the training image data such that a region to which the margin is added has higher image quality than other regions; and
setting a margin in which the recognition accuracy is equal to or greater than a threshold as a margin corresponding to the classification.

Supplementary Note 26

The program according to Supplementary Note 25 causing the computer to perform:
setting a region to which a different margin is added to each of the plurality of pieces of training image data;
identifying accuracy with which the remote monitoring device recognizes the target when image processing is performed on each of the plurality of pieces of training image data to which the different margin is added; and
setting a margin in which the recognition accuracy is equal to or greater than a threshold as a margin corresponding to the classification.

1 Image processing system
3 Remote driver
5 Vehicle
10 In-vehicle camera
100 Information processing device
101 Image acquisition unit
110 Region determination unit
111 Target detection unit
112 Classification identification unit
200 Image processing device
201 Image acquisition unit
210 ROI determination unit
211 Target detection unit
212 Classification identification unit
213 Optimal margin acquisition unit
220 Image processing unit (encoder)
230 Communication unit
250 Optimal margin storage unit
260 Margin setting unit
300 Margin setting device
400 Remote control device
410 Image recognition unit

What is claimed is:
1. An information processing device comprising:
at least one memory storing instructions, and
at least one processor configured to execute the instructions to:
acquire an image captured by an imaging unit mounted on a vehicle;
detect a target region including a target in the acquired image;
identify classification including a type of the detected target and a size of the detected target region;
determine a region obtained by adding a margin corresponding to the identified classification to the target region as an image processing region;
identify accuracy with which a remote monitoring device monitoring the vehicle recognizes the target in accor- dance with the type of the detected target and the size of the detected target region, and set a margin corresponding to the type of the detected target and the size of the detected target region in accordance with the identified accuracy.

2. The information processing device according to claim 1, wherein the margin is set so that, even when image processing is performed on an image in which the region obtained by adding the margin corresponding to the identified classification is set, recognition accuracy of the image is equal to or greater than a threshold.

3. The information processing device according to claim 1, wherein the at least one processor configured to execute the instructions to determine the region obtained by adding the margin to the target region as an image processing region with higher image quality than other regions.

4. The information processing device according to claim 1, wherein the at least one processor configured to execute the instructions to:

identify classification of training image data in which a type of target included in an image is determined, in accordance with the determined type of target and size of the determined target:

set a region obtained by adding a margin to the target region including a target included in the training image data;

identify accuracy with which the remote monitoring device recognizes the target when image processing is performed on the training image data such that a region to which the margin is added has higher image quality than other regions; and set a margin in which the recognition accuracy is equal to or greater than a threshold as the margin corresponding to the classification.

5. The information processing device according to claim 4, wherein the at least one processor configured to execute the instructions to:

set a region to which a different margin is added to each of the plurality of pieces of training image data:

identify accuracy with which the remote monitoring device recognizes the target when image processing is performed on each of the plurality of pieces of training image data to which the different margin is added; and set a margin in which the recognition accuracy is equal to or greater than a threshold as the margin corresponding to the classification.

6. The information processing device according to claim 1, further comprising a storage unit configured to store the margin corresponding to the classification.

7. An information processing system comprising:

at least one memory storing instructions, and at least one processor configured to execute the instructions to:

acquire an image captured by an imaging unit mounted on a vehicle;

detect a target region including a target in the acquired image;

identify classification including a type of the detected target and a size of the detected target region;

determine a region obtained by adding a margin corresponding to the identified classification to the target region as an image processing region;

identify accuracy with which a remote monitoring device monitoring the vehicle recognizes the target in accordance with the type of the detected target and the size of the detected target region, and to set the margin corresponding to the type of the detected target and the size of the detected target region in accordance with the identified accuracy.

8. The information processing system according to claim 7, wherein the margin is set so that, even when image processing is performed on an image in which the region obtained by adding the margin corresponding to the identified classification is set, recognition accuracy of the image is equal to or greater than a threshold.

9. The information processing system according to claim 7, wherein the at least one processor configured to execute the instructions to determine the region obtained by adding the margin to the target region as an image processing region with higher image quality than other regions.

10. The information processing system according to claim 7, wherein the at least one processor configured to execute the instructions to:

identify classification of training image data in which a type of target included in an image is determined in accordance with the determined type of target and size of the determined target:

set a region obtained by adding a margin to the target region including a target included in the training image data:

identify accuracy with which the remote monitoring device recognizes the target when image processing is performed on the training image data such that a region to which the margin is added has higher image quality than other regions; and set a margin in which the recognition accuracy is equal to or greater than a threshold as the margin corresponding to the classification.

11. The information processing system according to claim 10, wherein the at least one processor configured to execute the instructions to:

set a region to which a different margin is added to each of the plurality of pieces of training image data;

identify accuracy with which the remote monitoring device recognizes the target when image processing is performed on each of the plurality of pieces of training image data to which the different margin is added; and set a margin in which the recognition accuracy is equal to or greater than a threshold as a margin corresponding to the classification.

12. The information processing system according to claim 7, further comprising a storage configured to store a margin corresponding to the classification.

13. An information processing method comprising:

acquiring an image captured by an imaging unit mounted on a vehicle;

detecting a target region including a target in the acquired image;

identifying classification including a type of the detected target and a size of the detected target region;

determining a region obtained by adding a margin corresponding to the identified classification to the target region as an image processing region;

identifying accuracy with which a remote monitoring device monitoring the vehicle recognizes the target in accordance with the type of the detected target and the size of the detected target region; and setting a margin corresponding to the type of the detected target and the size of the detected target region in accordance with the identified accuracy.

14. The information processing method according to claim 13, wherein the margin is set so that, even when image processing is performed on an image in which the region obtained by adding the margin corresponding to the identified classification is set, recognition accuracy of the image is equal to or greater than a threshold.

15. The information processing method according to claim 13, further comprising determining the region obtained by adding the margin to the target region as an image processing region with higher image quality than other regions.

16. The information processing method according to claim 13, further comprising:
   identifying classification of training image data in which a type of target included in an image is determined in accordance with the determined type of target and size of the determined target;
   setting a region obtained by adding a margin to the target region including a target included in the training image data;
   identifying accuracy with which the remote monitoring device recognizes the target when image processing is performed on the training image data such that a region to which the margin is added has higher image quality than other regions; and
   setting a margin in which the recognition accuracy is equal to or greater than a threshold as the margin corresponding to the classification.

17. The information processing method according to claim 16, further comprising:
   setting a region to which a different margin is added to each of the plurality of pieces of training image data;
   identifying accuracy with which the remote monitoring device recognizes the target when image processing is performed on each of the plurality of pieces of training image data to which the different margin is added; and
   setting a margin in which the recognition accuracy is equal to or greater than a threshold as the margin corresponding to the classification.

* * * * *